ANGELO C. GIURLANDO
HRANT H. YOUSOUFIAN
INVENTORS

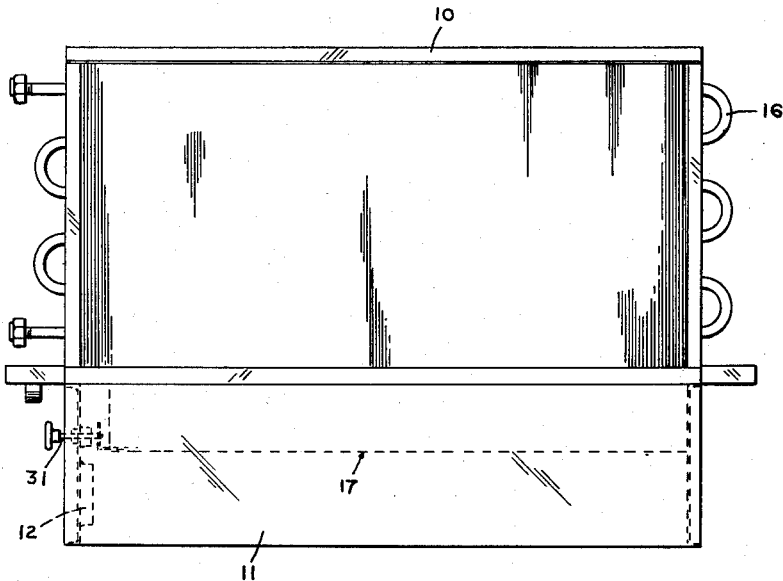
FIG. 1
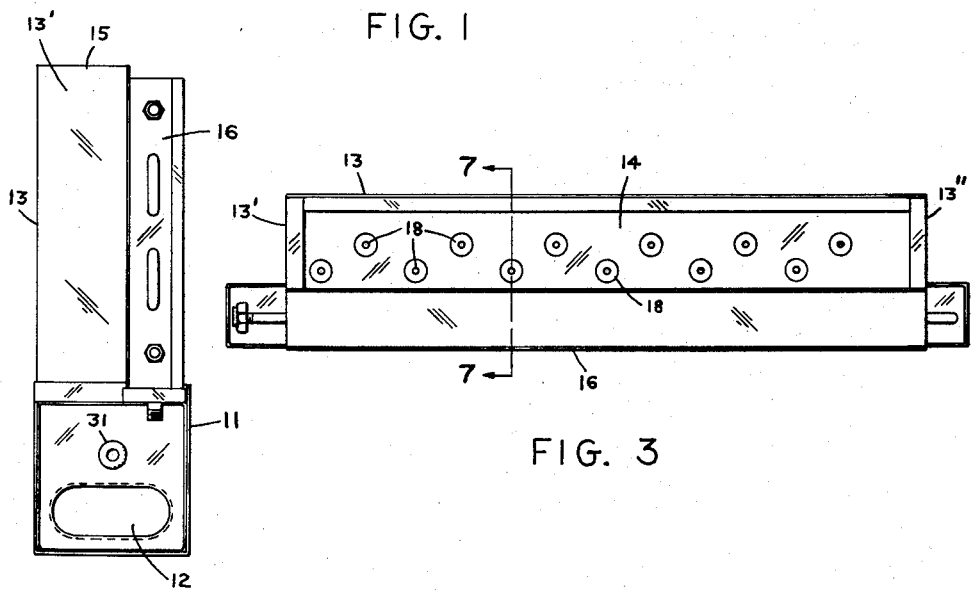
FIG. 2
FIG. 3
ANGELO C. GIURLANDO
HRANT H. YOUSOUFIAN
INVENTORS June 1, 1965 A. C. GIURLANDO ETAL 3,186,327
INDUCTION UNIT FOR AIR CONDITIONING SYSTEMS
Filed Feb. 28, 1963 4 Sheets-Sheet 2
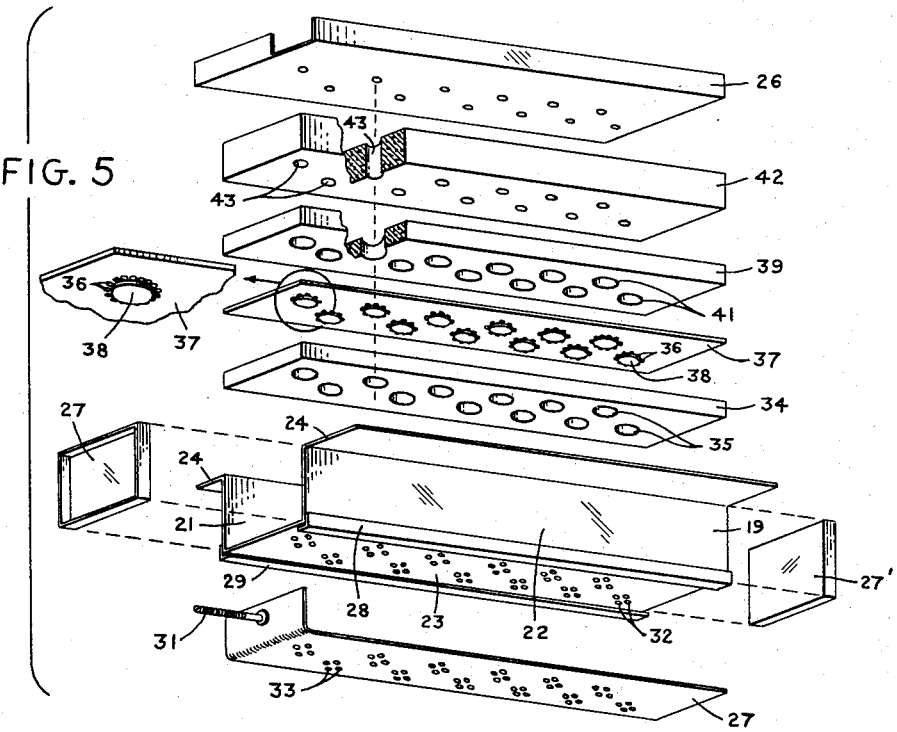
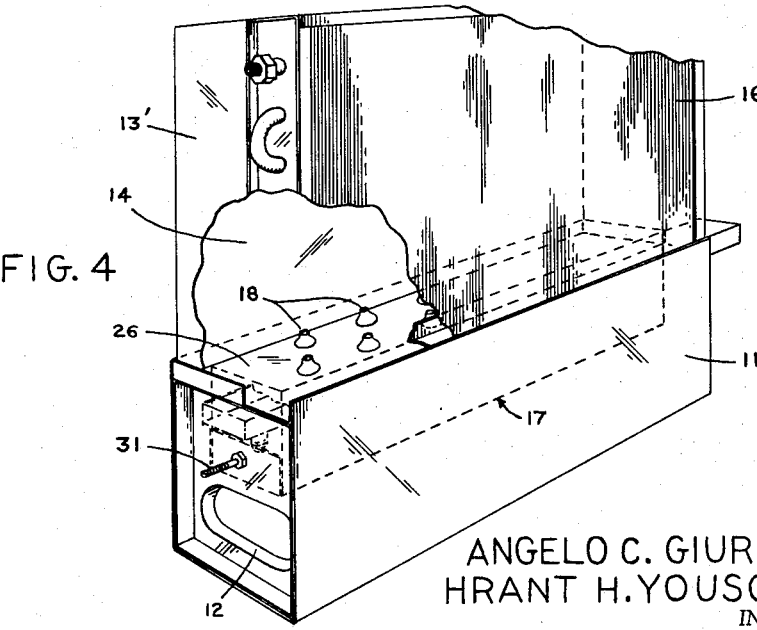
ANGELO C. GIURLANDO
HRANT H. YOUSOUFIAN
INVENTORS
BY Daniel H. Bobis
Atty

BY Daniel H. Bobis
Atty

United States Patent Office 3,186,327
Patented June 1, 1965

3,186,327
INDUCTION UNIT FOR AIR CONDITIONING SYSTEMS
Angelo C. Giurlando, Iselin, and Hrant H. Yousoufian, Verona, N.J., assignors to Worthington Corporation, Harrison, N.J., a corporation of Delaware
Filed Feb. 28, 1963, Ser. No. 261,722
9 Claims. (Cl. 98—38)

This invention relates to an air conditioning apparatus and particularly to a unit for distributing a mixture of air into a room or enclosure, the mixture consisting of primary conditioned air and secondary or room air which has been pre-treated by contact with a controllable heat exchange media.

Room induction units of the type contemplated possess many desirable characteristics in that they are economical to build, simple to operate and provide a favorable circulation of air through the room to be conditioned. Basically the units are constructed to eject primary conditioned air under pressure in a mixing chamber whereby secondary or room air induced into the mixing chamber through a variable capacity heat exchanger to either raise or lower the temperature of secondary air prior to mixing is conditioned as may be required. Thereafter, the mixture of primary conditioned air and tempered secondary air is directed into the room being conditioned to meet the heating or cooling load.

In one type of system using induction units, primary conditioned air is supplied to a plurality of induction units from a central source at a pressure of about 4 or 5 inches of water static pressure. At the point of use, this pressure is reduced within the induction unit to about 1 to 2 inches static pressure and then forced through nozzle means in high velocity jets or streams into the mixing chamber.

To achieve uniformity in the operation of the primary air nozzles regardless of the distance from the primary air source, it is necessary that the entire system be adjusted to a balanced condition preferably at the time of installation.

System balancing, following accepted practice, is ordinarily achieved by throttling primary air at each induction unit to provide a desired rate of air flow. Thus, units closer to the primary air supply and operating at higher plenum pressures will ordinarily require more throttling than units remote from the primary air source.

It has been found that in dropping supply pressure 2 to 4 inches for suitable nozzle pressure through a valving means, an excessive degree of undesirable noise is usually developed. This noise, even though baffled, is often of such pitch and intensity as to render the induction unit commercially impractical.

The prior art has attempted to overcome the noise problem by use of expedients such as expansion chambers, baffles, and elaborate passages. Also, sound absorbing materials have been disposed to contact the primary air stream. These devices, however, while exhibiting some degree of success, do not constitute an entirely satisfactory solution.

The present invention overcomes this problem by providing a single chambered primary air plenum to receive the conditioned high pressure air, which plenum has a plurality of nozzles connected thereon to eject conditioned air into the mixing chamber for inducing the flow of secondary or room air, and means including a sliding type throttling damper and attenuating assembly providing a plurality of separate passages each leading to an individual and separate nozzle to throttle the pressure of the conditioned air, regulate the volume of air delivered through said nozzle, and attenuate the noise level produced by throttling the conditioned air as it passes from the primary air plenum to the mixing chamber; the sliding type throttling damper permits simultaneous adjustment of the static pressure of the air delivered through each nozzle and an attenuating means in each passage means of the attenuating assembly downstream of the sliding type throttling damper serves to filter high frequency and other annoying noises from the air stream before it enters the mixing chamber.

It is an object of the invention to provide an air conditioning induction unit for quietly and efficiently circulating a mixture of primary and secondary air to a room to be conditioned.

A further object is to provide a unit capable of discharging a high velocity stream of primary air in such manner as to induce a secondary stream of room air into contact with means for treating the latter stream prior to mixing with the primary air.

Another object is to provide a unit of the type described in which primary air streams are so throttled and attenuated as to minimize the amount of noise generated by the primary air as a result of throttling thereof.

A still further object is to provide an induction unit having heat exchange means disposed in the path of secondary air entering the unit, and nozzles so positioned relative the heat exchange means to direct a plurality of high velocity streams of primary air along heat exchanger surfaces, said primary air being passed through an adjustable throttling damper and attenuating assembly prior to entering the mixing chamber whereby the static pressure of said high velocity streams of primary air is adjusted and undesirable noises are absorbed therefrom.

These and other objects of the invention will become clear to one skilled in the art from the following description made in conjunction with the drawings, in which:

FIGURE 1 is a front elevation view of one form of induction unit showing the internal damper assembly dotted therein.

FIGURE 2 is an end view of the induction unit in FIGURE 1.

FIGURE 3 is a top plan view of the induction unit shown in FIGURE 1.

FIGURE 4 is a partial perspective view of the induction circulator of FIGURE 1 partially broken away to show the invention.

FIGURE 5 is an exploded view of the throttling damper and attenuating assembly.

Figure 6:
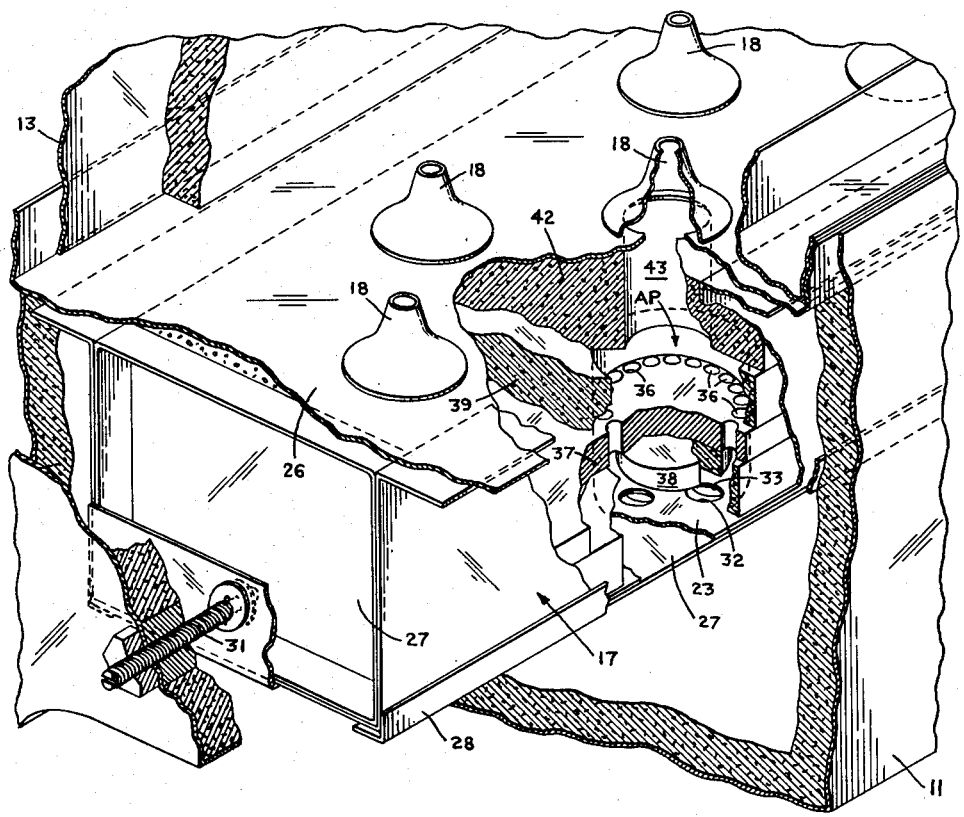
FIGURE 6 is a perspective view on an enlarged scale and with portions broken away of the adjustable throttling damper and attenuating assembly.

Referring to the figures, the preferred form of the induction unit is generally designated 10 and includes basically an elongated outer shell or casing forming an enclosure. A primary air plenum or chamber 11 extends longitudinally of the enclosure and is provided with at least one opening 12 adapted for connection to a duct or other means carrying a slightly pressurized stream of primary conditioned air. Where a plurality of induction units are to be serially connected, openings at opposed ends of the plenum can be connected by suitable conduit means to pass a stream of primary air therethrough. Where, however, the unit is read-ended the end of the plenum remote from the inlet end will be closed.

A heat exchange means 16 is associated with the primary air plenum 11 and forms with the back wall 13 of the casing, the side walls 13′ and 13″ extending upwardly from the plenum 11, and the plenum 11, a mixing chamber 14 having a discharge outlet 15 at the end of the mixing chamber remote from the primary air plenum.

Conditioned primary air is supplied to plenum 11 and introduced into the mixing chamber by means of constricted nozzles or openings 18 so formed and arranged with respect to the heat exchanger as to induce secondary or room air therethrough, into the mixing chamber 14.

For efficient system operation, the proportion of primary air to secondary air is maintained at a ratio between 1 to 4 and 1 to 8. Primary air is supplied from the central source at a predetermined condition of temperature and humidity and at a substantially constant rate of flow. To meet the load conditions in a particular room or area, the quality of secondary room air entering mixing chamber 14 is adjusted or tempered by varying the heat transfer characteristics of the heat exchange means 16. Thus, by controlling the flow of heat transfer fluid, individual control at each induction unit is possible. This is done manually or automatically and is well known in the art.

In the present invention conditioned primary air is directed from the plenum 11 to the mixing chamber 14, into which it is ejected through nozzles 18. Between plenum and nozzles, the primary air is segmentally throttled to a reduced pressure, and attenuated to reduce noise level, by means of an adjustable throttling and attenuating assembly generally designated 17 to be hereinafter described more fully.

*Throttling and attenuating assembly*

Referring to FIGURES 5 and 6, the throttling damper and attenuating assembly 17 includes an elongated rectangular box-like member 19 formed with substantially air-tight corner seams. The box-like member embodies a pair of spaced apart longitudinally extending upstanding walls 21 and 22 supporting a lower panel 23. Flanges 24 at the side walls upper edges are adapted to supportably engage adjacent panels of plenum 11 to position valve means 17 at the plenum top side adjacent mixing chamber 14. Similarly formed end panels 27 and 27' are closely fitted to and fastened at the respective side walls 21 and 22 and lower panel 23. A nozzle plate 26 is supported on the upper surface of flanges 24 and forms a top closure to the box-like member.

Nozzles 18 as shown particularly in FIGURES 4 and 6 extend upwardly from the surface of plate 26 into the lower end of mixing chamber 14 and are so arranged to realize maximum efficiency in inducing secondary air flow through surfaces of the heat exchanger means 16.

The nozzle arrangement presently illustrated includes adjacently positioned parallel rows of equi-spaced nozzles. Adjacent rows are offset one from the other to provide a better coverage of the heat exchanger surface. This particular arrangement, however, does not constitute a limit to the invention but rather illustrates a pattern that has been found to be very effective.

Lower panel 23 supported at the lower side of the throttling damper and attenuating assembly 17 is formed of a flat rigid plate which can be fastened to side walls 21 and 22 or formed as an integral part of said side walls.

Lower panel 23 forms a stationary first member of the means for throttling or regulating the static pressure of the primary air as it flows from the primary air plenum to the mixing chamber 14.

Parallel tracks 28 and 29 mounted adjacent the outer edge of lower panel 23 provide means for mounting a slidable damper plate 27 which is the second member of the means for throttling air flow or regulating the static pressure, which member will be held normally in contiguous relationship with lower panel 23 by the pressure of the primary air in the primary air plenum acting on the lower or outer surface thereof so that escape of air between the respective lower panel 23 and the damper plate 27 is minimized, and thus more absolute control and regulation of static pressure is obtained.

As is clearly shown in FIGURES 5, 6, 7 and 9 the lower panel 23 and the sliding damper plate 27 each have a plurality of spaced apertures or perforations as at 32 on panels 23 and 33 in plate 27. These apertures are formed into groups, the groups of apertures on the panel 23 being disposed coincident with a centerline parallel to the vertical centerline extending through the respective nozzles 18 associated therewith, it being clear from the drawings that each of the nozzles will have communication through an attenuating passage with its related apertures in the lower panel 23.

The apertures or perforations 33 formed on the sliding damper 27 will be so positioned that when the apertures 33 are concentrically aligned with the apertures or perforations 32 on the lower panel 23 the full cross-sectional area for passage of primary air will be provided and this will be referred to hereinafter as the full open position.

Figure 9:
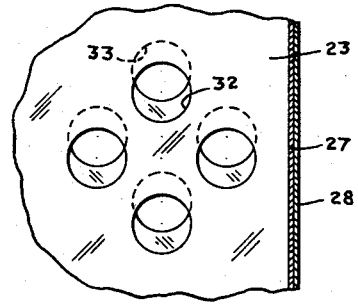
FIGURE 9 is a segmentary view taken along line 9—9 of FIGURE 7.

Lateral positioning or movement of plate 27 with respect to plate 23 will act to misalign the respective apertures or perforations 32 and 33 so as to reduce the cross sectional area for passage as is shown in FIGURE 9 of the drawings and this is the means by which throttling of the air flow and reduction in static pressure of the primary air is achieved.

Such lateral positioning is accomplished by means of a stud 30 mounted to one end of the damper plate 27 and so mounted as to permit the stud to be threadably received in a T-nut or collar 31 in the end wall of plenum 11. A slot or handle 30a on the end of the stud 30 permits the stud to be threaded back and forth along the T-nut so as to slide the apertures 33 on plate 27 into and out of alignment with apertures 32 in panel 23.

While apertures or perforations, together with one means of adjusting the same relative each other are shown, it is believed that those skilled in the art will understand that other means for adjustment or regulation of the static pressure, and the flow of the primary air can be embodied on the present construction without departing from the scope thereof.

Furthermore, while the instant embodiment of primary air flow control means includes cooperatively disposed circular ports in both panels 23 and plate 27, other geometric configurations such as slotted openings, and arrangements in both members may achieve a satisfactory variation in passage size to regulate the primary air flow leaving the plenum.

Figure 7:
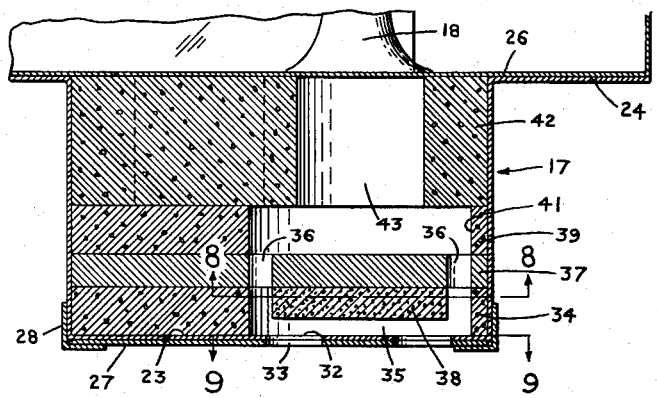
FIGURE 7 is a partial cross-sectional view taken on line 7—7 of FIGURE 3.

Referring to FIGURES 5 and 7, the alternative means to remove or dampen noises generated in the primary air passing from the plenum 11 to mixing chamber 14 as a result of pressure drop across the throttling static pressure adjustment means, is achieved in the attenuation passage generally designated AP extending from the upper face of panel 23 to the lower surface of panel 26.

As shown particularly in FIGURES 6 and 7, primary air is directed through a relatively tortuous path of varying cross-sectional area lined with an acoustical material capable of absorbing high frequency sound thus minimizing the degree of undesirable noise in the primary air stream. This dampening effect is achieved with only a slight increase in the back pressure exerted by the acoustic filter on the primary air stream.

As seen in FIGURES 6 and 7, box-like member 19 is substantially occupied by a material having preferably an open cellular surface particularly adapted to absorb high frequency sound. It is found that a plastic such as polyurethane foam and other similar cellular-structured foam plastics exhibit the characteristics required for satisfactory sound attenuation in the primary air coming in contact therewith. Also, fibrous materials such as fiberglass, glasswool and the like may be used.

Each nozzle 18 is individually connected to the plenum 11 through the throttling damper and its respective throttling damper and novel sound absorbing attenuating passage. Each attenuating passage is made up of sandwiched layers of acoustic absorbent members, for example, that designated AP in FIGURE 6.

The sound absorbing passage AP is characterized by layers of sound absorbing material with a diffuser means disposed in the passage.

The first sound absorbing layer 34 is shown in FIGURES 5 and 6 as supported on panel 23 and includes a plurality of circular openings 35 spaced longitudinally and in alignment with grouped apertures 32 to receive air from plenum 11. Each opening 35 has a diameter such that the open area is slightly larger than said groups of arranged apertures 32.

The diffuser means 37 includes a plurality of intermediary passages 36 closely spaced and arranged preferably out of vertical alignment or offset with respect to the axis of the respective apertures or perforations 32 and 33. Diffuser 37 is positioned in the attenuating passage downstream of the throttling damper assembly to form in the passage an upper and a lower section communicated by the passages 36.

A target or cushion 38 depending from the underside of diffuser means 37 is held in place by suitable cement, adhesive or other binding material. Cushion 38 as shown in FIGURE 7 may be of a generally flat configuration or may alternatively assume a non-uniform shape providing an irregular surface against which the high velocity primary air streams will impinge. In the instant device, cushion 38 comprises a resilient member formed of the previously mentioned cellular structured foam material and having a peripheral edge disposed adjacent the inner edge of the circularly arranged passages 36, forming a round absorbing barrier.

Figure 8:
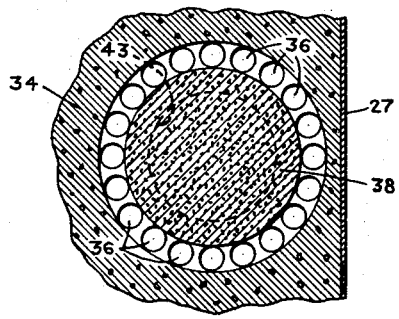
FIGURE 8 is a segmentary view taken along line 8—8 of FIGURE 7.

Although passages 36 are illustrated as being small diameter, equispaced openings arranged to define a substantially annular opening, it has been found that satisfactory results are also obtained through alternate arrangements. For example, a series of circularly disposed arcuate passages positioned substantially in the manner of the openings 36 of FIGURE 8 may also be used.

To assure a relatively smooth wall surface along passages 36, diffuser means 37 is preferably fabricated of a rigid material such as Masonite, wood, or metal adapted to be punched or drilled. To function as an acoustic filter, or as means to transform low frequency noises into high frequency noises, passages 36 are preferably elongated and may consist of thin tubular elements circularly positioned in the diffuser to define said passages.

The primary purpose in constricting the flow of air through intermediary diffuser passages 36 is to provide direct impingement of air streams against sound absorbent walls and to change the velocity and pressure characteristics of the air. Passages 36 are sufficiently small to filter low frequency sounds yet not generate other sounds which would tend to complicate the noise problem.

Since higher frequency noises are much more readily attenuated in an absorbent material, the open cellular-like walls of the attenuating passage AP will have the effect of eliminating or substantially reducing the intensity of sound generated by air passing through passages 36.

The second sound absorbing layer 39 includes a plurality of openings 41 similar to those provided in the first sound absorbing layer 34. Element 39 rests on the diffuser means 37 with each opening 41 also having its peripheral edge disposed outwardly of the ring of intermediary passages 36.

A third sound absorbing layer 42 rests upon layer 39 and is provided with elongated passages 43 disposed coaxially with respect to the axis of the associated nozzle 18. Passages 43 are of a lesser diameter than openings 41 to direct primary air into passing contact with sound absorbing walls of passage 43 prior to entering the inlet side of nozzles 18.

While the disclosed attenuating passage AP affords in effect a labyrinth type arrangement, through which primary air streams will progress, the sharp reduction in noise intensity is not entirely attributable to this factor alone. A more pointed reason for excellent sound absorption resides in the fact that when high velocity streams of primary air flow through the labyrinth so formed, the turning of the flow with consequent impingement allows the sound absorbing characteristics of the urethane foam to be fully utilized. Also, by filtering the noise though passages 36, to transform low frequency sounds to high frequency sounds assures a quieter overall operation.

It should be appreciated that while we have described a specific embodiment for the throttling damper and attenuating assembly, alternate embodiments of the disclosed arrangements may be made to achieve the purposes of this device. For example, while the passageways are shown as being made up of a plurality of separate layers, the filtering effect is achieved equally as well through use of a plurality of separate tubular members individually constructed and adapted to communicate the slide valve with the nozzle inlets. Further, while the instant attenuating passage is essentially of a cylindrical arrangement embodying a plurality of different diameters forming a labyrinth passage, the passage could be modified to permit introduction of primary air through the side or end walls of the box-like member 19 to increase or decrease labyrinth effect as may be desired.

It has been found that in the preferred form of the invention above described that a greater degree of secondary air induction is achieved within the mixing chamber of the unit due to the high velocity of exiting air through nozzles 18. This result is attributable either directly or indirectly to the means for controlling or regulating the flow of the primary air through the attenuating passage at a relatively high static pressure such that each nozzle receives air substantially equal in amount to that of the adjacent nozzles.

Further, the arrangement for forming primary air streams which are then disrupted and reformed into a plurality of high velocity streams for impingement against the sound absorbing wall permits substantially noiseless operation of the induction unit.

The great simplicity of construction and the ease for making the needed adjustment in the primary air control arrangement assures trouble-free operation of the unit with little or no maintenance or upkeep.

It will be understood by those skilled in the art that the present embodiment may be varied in certain structural features without departing from the spirit and scope of the invention as defined in the following claims.

What is claimed is:

1. An induction unit for an air conditioning system having a source of pressurized conditioned air, which unit includes:
    (a) a casing forming a plenum having an inlet connected with said supply of conditioned air,
    (b) a mixing chamber communicated with a source of non-conditioned air,
    (c) a throttling and attenuating assembly in said casing including:
        (1) an upper wall having nozzle formed therein opening into said mixing chamber,
        (2) a lower wall including a valve means having adjustable openings therein for regulating the flow of conditioned air from said plenum to said closed attenuating assembly,
    (d) means in said closed attenuating assembly forming a plurality of attenuating passages individually communicating said valve means with each of said nozzles,
    (e) said attenuating passages including:
        (1) a cushion of a sound absorbing material disposed transversely of said attenuating passages forming upper and lower chambers therein, said upper chamber being in communication with at least one of said nozzles,
        (2) passage means in said cushion communicating said lower and said upper chambers respectively for passing streams of air to the latter,
(3) said cushion of sound absorbing material being disposed in substantial alignment with said valve openings to receive streams of air directed against the cushions.

2. An induction unit as defined in claim 1 wherein said cushion of sound absorbing material includes a plurality of passages formed therein adjacent periphery walls of said attenuating passage.

3. An induction unit as defined in claim 1 wherein said cushion of sound absorbing material includes a plurality of circularly arranged passages formed therein, disposed out of alignment with openings in said valve means to avoid uninterrupted passage of air passing from said valve means into said plurality of passages.

4. In an induction unit as defined in claim 3 wherein said cushion of sound absorbing material includes a plurality of circularly arranged openings formed therein and disposed at the periphery of said lower chamber and outwardly of openings formed in said valve plate.

5. An induction unit for an air conditioning system having a source of primary conditioned air and adapted to induce flow of secondary air therein from a space to be conditioned,
(a) a casing having an inlet for secondary air and a discharge outlet,
(b) a single chambered plenum in said casing connected to said source of primary conditioned air,
(c) a mixing chamber in said casing communicating with said inlet and said discharge outlet,
(d) a heat exchanger disposed in the casing whereby secondary air passing through said inlet to said mixing chamber will pass in heat exchange relation therewith,
(e) a plurality of nozzle means connected to said plenum and disposed to eject primary conditioned air into the mixing chamber for inducing flow of secondary air into the mixing chamber from the space to be conditioned,
(f) and a throttling damper and attenuating means disposed between said plenum and said nozzle to provide a plurality of separate passages each connected to its respective nozzle means to throttle and regulate the static pressure of the primary conditioned air, and attenuate the noise level produced by said throttling,
(g) said throttling damper and attenuating means includes a throttling means common to all of said separate passages.

6. The induction unit of claim 5 including an attenuator in each separate passage of the throttling damper and attenuating means, each of said attenuators being operative to filter high frequency sounds and other noises from the primary air entering the mixing chamber.

7. The induction unit of claim 6 wherein said attenuator is further operative to filter low frequency sounds without generating other noises.

8. An induction unit for an air conditioning system in which conditioned primary air induces secondary air therein from the area to be conditioned wherein it will be mixed with the primary air prior to discharge, said induction unit comprising:
(a) a casing
(b) a plenum in the casing connected to the source of primary air
(c) a plurality of nozzle means in communication with the plenum
(d) a heat exchanger disposed in the casing
(e) a mixing chamber in the casing into which the primary air from the nozzles is delivered to induce the secondary air to pass in indirect heat exchange relationship with the heat exchanger prior to entering the mixing chamber wherein it will mix with the primary air and be discharged from the casing
(f) throttling means disposed between the mixing chamber and the plenum to be selectively positioned to regulate the flow of primary air leaving the plenum
(g) attenuating means disposed between the nozzle means and the plenum whereby the sound produced by the primary air will be absorbed
(h) said attenuating means having at least one transverse partition therein in which a plurality of individual passages extend therethrough to create a tortuous passage for the primary air to travel prior to being discharged from the nozzle means.

9. The induction unit of claim 8 wherein:
(a) the throttling means disposed adjacent to plenum includes a plurality of adjustable apertures
(b) said attenuating means is separately disposed spaced from each of the said plurality of apertures
(c) each of the attenuating means having a pair of spaced openings of larger cross-sectional area than the plurality of apertures
(d) a plurality of passages formed in each of the attenuating means and disposed therein transversely to separate and communicate the spaced openings.

References Cited by the Examiner
UNITED STATES PATENTS

| | | | |
|---|---|---|---|
| 2,948,210 | 8/60 | Conlon | 98—38 |
| 2,987,982 | 6/61 | Wilson | 98—38 |
| 3,014,496 | 12/61 | Chieregatti | 98—38 |
| 3,092,178 | 6/63 | Birdsall | 78—38 X |
| 3,094,189 | 6/63 | Dean | 98—38 X |

ROBERT A. O'LEARY, *Primary Examiner.*